(12) United States Patent
Steele et al.

(10) Patent No.: US 8,603,199 B2
(45) Date of Patent: Dec. 10, 2013

(54) METHOD TO UPGRADE BIO-OILS TO FUEL AND BIO-CRUDE

(75) Inventors: Philip H. Steele, Starkville, MS (US); Charles U. Pittman, Jr., Starkville, MS (US); Leonard L. Ingram, Jr., Starkville, MS (US); Sanjeev Gajjela, Starkville, MS (US); Zhijun Zhang, Harbin (CN); Priyanka Bhattacharya, Knoxville, TN (US)

(73) Assignee: Mississippi State University, Mississippi State, MS (US)

( * ) Notice: Subject to any disclaimer, the term of this patent is extended or adjusted under 35 U.S.C. 154(b) by 106 days.

(21) Appl. No.: 12/896,741

(22) Filed: Oct. 1, 2010

(65) Prior Publication Data

US 2011/0192072 A1   Aug. 11, 2011

Related U.S. Application Data

(60) Provisional application No. 61/247,751, filed on Oct. 1, 2009.

(51) Int. Cl.
*C10L 1/18* (2006.01)

(52) U.S. Cl.
USPC .................... 44/310; 44/311; 44/307; 44/308

(58) Field of Classification Search
None
See application file for complete search history.

(56) References Cited

U.S. PATENT DOCUMENTS

| | | | | |
|---|---|---|---|---|
| 4,344,770 A | * | 8/1982 | Capener et al. | 44/388 |
| 2009/0000941 A1 | * | 1/2009 | Kropf | 204/157.62 |
| 2009/0005592 A1 | * | 1/2009 | Hassan et al. | 562/465 |

OTHER PUBLICATIONS

Mohan D. et al., Pyrolysis of Wood/biomas for Bio-oil: Critical Review, 2006, Energy & Fuels, vol. 20, No. 3, pp. 848-889.*
Zhang, Q. et al., Upgrading bio-oil over different solid catalysts, 2006, Energy & fuels, vol. 20, No. 6, pp. 2717-2720.*

* cited by examiner

*Primary Examiner* — Yate K Cutliff
(74) *Attorney, Agent, or Firm* — Butler, Snow, O'Mara Stevens & Cannada PLLC

(57) ABSTRACT

This invention relates to a method and device to produce esterified, olefinated/esterified, or thermochemolytic reacted bio-oils as fuels. The olefinated/esterified product may be utilized as a biocrude for input to a refinery, either alone or in combination with petroleum crude oils. The bio-oil esterification reaction is catalyzed by addition of alcohol and acid catalyst. The olefination/esterification reaction is catalyzed by addition of resin acid or other heterogeneous catalyst to catalyze olefins added to previously etherified bio-oil; the olefins and alcohol may also be simultaneously combined and catalyzed by addition of resin acid or other heterogeneous catalyst to produce the olefinated/esterified product.

23 Claims, 4 Drawing Sheets

METHOD TO UPGRADE BIO-OILS TO FUEL AND BIO-CRUDE

CROSS REFERENCE TO RELATED APPLICATIONS

This application claims priority to provisional application 61/247,751, which was filed on Oct. 1, 2009, and is hereby incorporated by reference in its entirety.

STATEMENT REGARDING FEDERALLY SPONSORED RESEARCH OR DEVELOPMENT

This invention was made with Government support under DE-FG36-06GO86025 awarded by the U.S. Department of Energy. The Government has certain rights in the invention.

FIELD OF THE INVENTION

The present invention is generally directed toward a method for esterification and simultaneous olefination or esterification to upgrade bio-oils to fuel and biocrude.

BACKGROUND OF THE INVENTION

Bio-Oil Characteristics

Fast pyrolysis is a process that can produce pyrolysis oil, often termed bio-oil, from any lignocellulosic biomass type. Bio-oil is produced by fast pyrolysis of small biomass particles at 400° C. to 650° C. in the absence of oxygen. The yield of bio-oil is relatively high at 60% to 80% dry weight basis. Bio-oil chemical properties vary with the feedstock, but woody biomass typically produces a mixture of 30% water, 30% phenolics, 20% aldehydes and ketones, 15% alcohols and 10% miscellaneous compounds.

As a fuel, bio-oil has potential environmental advantages because combusted bio-oil produces half the $NO_X$ and no $SO_X$ when compared to petroleum fuels. Because bio-oil is produced from renewable biomass, it is considered to be $CO_2$ neutral. Bio-oil can be burned directly in engines. Electricity has been produced by bio-oil fueled diesel engines, and turbines have been specially modified to successfully burn bio-oil. However, some properties of bio-oil such as lower octane, acidity, immiscibility with hydrocarbons, viscosity change over time and a distinctive odor have prevented its commercialization as a fuel to date, other than for use in pilot and demonstration projects. Researchers have unanimously concluded that some form of upgrading of raw bio-oils is required prior to utilization for fuel.

Bio-oil can contain up to 45 percent oxygen which is responsible for most of the various negative properties described. Bio-oil catalytic hydrodeoxygenation (HDO) has been investigated using various catalysts and has resulted in reducing or eliminating some of the negative properties of bio-oils due to the elimination of oxygen and/or reduction of double bonds and aldehyde and keto groups. Several groups of researchers are utilizing various catalysts to produce HDO bio-oil. However, approximately 3 wt % of hydrogen is required to apply HDO and nearly 30% of energy contained in the original raw bio-oil is lost in the process. Another potential upgrading process, referred to herein as esterification for the purpose of this patent, provides considerably higher yields and does not require the expense of hydrogen and the capital outlay for hydrotreating infrastructure.

Bio-Oil Upgrading Via Alcohols Addition

Bio-oil primarily contains reactive hydroxyl, carbonyl and carboxylic groups which undergo etherification and esterification reactions during storage. These condensation reactions generally increase the molecular weight and are responsible for bio-oil viscosity increase over time that makes raw bio-oil difficult to store. The problem of polymerization of the bio-oil can be minimized if these reactions are controlled. Researchers have demonstrated that these polymerization reactions can be slowed by reacting alcohols with the reactive sites of the oligomers present in the bio-oil. These alcohols have been shown to restrict the continuation of the polymerization reaction to increase bio-oil stability. The monofunctional alcohols can react with the acidic compounds present in the bio-oil to form polyesters which may again undergo esterification reactions with alcohol to form low molecular weight materials. Similarly, aldehydes and ketones can be changed to their corresponding acetals and ketals by reacting with alcohol, and this reaction will act to block the reactive sites and restrict the polymerization reactions which are responsible for the temporal increase in bio-oil viscosity (Diebold and Czernik 1997).

Further research was performed in 2000 (Boucher et al.) to determine the influence of alcohol's addition to stabilize and upgrade bio-oil produced from tree bark feedstock. The upgrading was practiced to produce a potential fuel for gas turbines. The methanol addition improved some properties of the raw bio-oil. Viscosity was reduced, higher heating value (HHV) was increased significantly to 32 MJ/kg, and accelerated aging was significantly reduced. The improvement of properties resulting from methanol addition correlate to those found by other investigators who have added alcohols to stabilize or improve the fuel value of raw bio-oils.

Esterification Via Alcohol and Catalyst Addition

"Esterification" will be referenced in this disclosure as the catalyzed reaction of the bio-oil organic acids and other compounds with alcohols. Reactions, such as etherification, acetalization, ketalization and others are known to occur as a result of the catalyzed esterification of alcohols combined with bio-oil. The term esterification, as used herein, will be utilized to simplify the description of our invention, but it is understood that all reactions resulting from a combination of alcohol, bio-oil and an esterifying catalyst are being referenced with the term "esterification" as applied in this disclosure. The chemical combinations of alcohol and acid catalyst to produce an esterification reaction with the carboxylic acids prevalent in bio-oil have been shown to decrease bio-oil acidity, as well as to convert aldehydes to acetals. While the esterification reaction has been shown to improve most bio-oil properties, the reaction also produces a significant amount of water from the reaction (Tang et al., 2009; Xiong et al., 2009; Peng et al., 2008; Peng et al., 2009; Tang et al., 2008; Deng et al., 2009; Zhang et al., 2006). This increased water acts to reduce the total energy yield from addition of alcohol and from the higher heating value provided by the esters, acetals and ketals resulting from the reaction.

Radlein et al. (1995, 1997) provided an early esterification reaction example by dissolving freshly produced pyrolytic tar in 51.6 wt % of ethanol. The water content of this high viscosity bio-oil was 1.74%. Therefore, the organic fraction of the tar was 46.7%. Molecular sieve media and 1.4 wt % of sulfuric acid comprised the reacted mixture. The mixture was kept at room temperature for a few hours. The formation of acetals and esters were detected by GC/MS analysis within a few minutes of the mixing. After two hours' reaction time, the amount of ethanol and water had both decreased significantly. The water content was 0.28%, whereas the amount of ethanol remaining in the mixture was 35.9 wt %. Higher amounts of ethyl acetate, acetyl formate and diethoxyacetal of hydroxyacetaldehyde were detected. All of these esterification reactions produced water in the reaction medium. However, the lower amount of water produced by this experiment indicated that the molecular sieve media removed significant amounts of both the water resulting from condensation reactions and a portion of the water initially present in the raw bio-oil.

Moens and Czernik (2008) performed esterification experiments with a stoichiometric, or excess, amount of alcohol. The product was a two-phase compound. One phase (39 wt %) was a distillate containing water, acids and other carbonyl groups. The upgraded phase (63 wt %) was a semi-solid with low acidity and reduced oxygen with a water content of zero. This route to esterified bio-oil appears to provide low yield and a product of such high viscosity that it is unusable as a heating fuel.

Hitten et al. (2009) published results of ethanol injection into a slow pyrolysis reactor. These practitioners attached the cross pipe carrying the pyrolysis vapors from the main pyrolyzer reactor tube to the condenser train. While the cross pipe leading to the reaction vessel was heated to 450° C., the reaction vessel itself was not heated. For this reason, the pyrolysis vapors inside the reaction vessel partially condensed in the reaction vessel such that the alcohol spray introduced into the reaction vessel necessarily contacted condensed vapors in liquid bio-oil form, as well as reacting with the pyrolysis vapors. Therefore, the Hitten et al. device, developed for application to a fast pyrolysis reactor, differs from the novel device and method of our invention in that, by our method, alcohol is injected into the hot vapor stream well prior to condensation of pyrolysis vapors.

Xiong et al. (2008) esterified bio-oil organic acids by application of a dicatopmoc ionic liquid ($C_6(mim)_2$-$HSO_4$) rather than the traditional acid catalyst. A two-phase liquid was obtained which was separated to provide a 49% yield of upgraded product. The properties of the upgraded fraction were improved to provide an HHV of 24.6 MJ/kg, an increased pH to 5.1 from 2.9, and a reduction of water content to 8.2% from 29.8%. GC/MS analysis confirmed esterification of organic acids to esters. The loss of 51% of the total reaction products in the form of a discarded aqueous fraction, however, will likely hinder any commercialization of this process.

Therefore, past practitioners have upgraded bio-oil by combining alcohols with bio-oils or by catalyzing bio-oil/alcohol mixtures to produce esterification reactions. The esterification reactions have all been described as increasing bio-oil water content to some degree. This water has usually been left in the final esterified bio-oil, but, in this case, it acts to reduce total HHV and partially reduces the energy increase obtained from production of esters, acetals and ketals. Alternatively, water removal has been achieved by discarding any aqueous fraction that may be produced simultaneously with the upgraded fraction; utilization of a water adsorbent to remove water produced by esterification has also been practiced.

Thermochemolysis with Tetramethyl Ammonium Hydroxide

Tetramethyl ammonium hydroxide (TMAH) thermochemolysis is pyrolysis combined with methylation of the polar groups evolved from the degradation of bio-polymers. Reaction of TMAH in the presence of alcohol produces methyl derivatives by hydrolysis, as well as by methanolysis. TMAH thermochemolysis, in the presence of methanol, can also convert completely/partially phenols to their corresponding methyl derivatives (Challinor 2001).

TMAH thermochemolysis of phenolic and lignin model compounds containing a β-5 linkage provided the methylated stilbenes as major products (Kuroda et al. 2002). Another group of researchers used furaldehyde, benzaldehyde, hydroxybenzaldehyde, methoxybenzaldehyde, di-methoxybenzaldehyde and vanillin as model compounds for TMAH thermochemolysis and found that TMAH not only acts as the methylating agent, but also reacts with the aldehydes according to Cannizzaro reaction. An in-situ methylation of the reaction products formed the corresponding esters and ethers (Tanczos et al. 1997). The product distribution indicated that the pyrolytic process involved two sequential reactions. At first, the aldehydes form an equimolar amount of corresponding alcohols and carboxylic acids; in the second step, methylation occurs. TMAH is an excellent methylating agent at high temperature. Therefore, the benzyl alcohols are converted to their corresponding ether, and the tetramethylammonium salt of the carboxylic acid decomposes to the methyl ester.

For better understanding of the TMAH thermochemolysis process, synthetic and natural lignins were pyrolyzed in the presence of TMAH. Coniferyl alcohol dimethyl ether, erythro/threo-1-(3,4-dimethoxyphenyl)-1,2,3-trimethoxypropane, and pinoresinol dimethylether were identified from GC/MS analysis. Phenolic models and lignin end units having β-5 structure gave methylated stilbene products during the TMAH-thermochemolysis process (Kuroda et al. 2002 2006).

$^{13}C$ labeled TMAH was also used for the thermochemolysis study of synthetic lignin dimer model compounds. The mechanistic study showed a number of base catalyzed rearrangement and elimination reactions to the lignin dimer, resulting in the methylation of alcohols and phenols to methyl ethers (Filley et al. 1999).

The comparison between the compounds released by Py-GC/MS with and without the application of TMAH of non-woody lignin samples was performed by a group of researchers (Del Rio et al. 2007). Pyrolysis of lignin in presence of TMAH undergoes β-O-4 ether bond cleavage and forms methylated aldehydes, ketones and acids. Presence of TMAH also initiated the high-temperature saponification of esters of p-hydroxycinnamic acid. Cleavage of the ether linkage at C-4 resulted in the methylation of free carboxyl and hydroxyl groups.

The TMAH thermochemolysis of levoglucosan and levoglucosan acetate formed the methyl ester of saccharinic acid, methyl acetate, methyl levoglucosan and other compounds. The thermochemolysis of cellulose produced methyl esters of pentanoic acid and butanoic acid (Schwarzinger et al. 2002). Pyrolysis of cellulose and lignin in the presence of TMAH produced a significant amount of aromatic acid and fatty acid methyl esters (Gauthier et al., 2003). The TMAH thermochemolysis fully converted the model aliphatic acid to its corresponding methyl esters (Joll et al., 2002). TMAH thermochemolysis of lignin produced some completely methylated compounds, such as 1,2-dimethoxybenzene, 3,4-dimethoxytoluene, 4-ethyl-1,2-dimethoxybenzene, 1,2,4-trimethoxybenzene, 1,2-dimethoxy-4-(2-propenyl)benzene, 3,4-dimethoxybenzoic acid, methyl ester and others (Klingberg et al, 2005).

As described, TMAH thermolysis has been employed to methylate various organic compounds and to assist in identifying the chemical structures of lignins and other biopolymers. TMAH thermochemolysis to convert bio-oil acids and their corresponding esters and ethers has not been performed by past practitioners.

Fractionation of Raw Bio-Oil to Produce a Pyroligneous Fraction Prior to Esterification or Olefination Marker and Petri (2008) disclose a method by which water fractionation is applied to obtain the pyroligneous and aqueous fractions as previously described. These inventors propose production of gasoline or diesel hydrocarbons from the pyroligneous fraction by two stages: hydrotreating followed by hydrocracking. It is proposed that the aqueous fraction be reformed to hydrogen which is then input to the hydrotreating and hydrocracking process. The fractionation into pyroligneous and aqueous fractions may be performed by any method, but water fractionation is the preferred method. The pyroligneous fraction produced by this process is highly viscous, and processing this thick bio-oil fraction in hydrotreating reactors is expected to be problematic. Marker and Petri (2008) did not propose esterification, esterification followed by olefination, or simultaneous olefination/esterification to reduce the viscosity of the pyroligneous fraction to allow practical hydrotreating.

Olefination of Esterified Bio-Oil or Simultaneous Olefination/Esterification of Bio-Oil The olefination of bio-oil model compounds and bio-oil has been attempted with limited success due to the immiscibility of olefin hydrocarbons with the water emulsion that comprises bio-oil (Yang et al. 2010; Zhang et al 2010). However, upgrading of bio-oil by olefinating esterified bio-oil, or by simultaneous esterification and olefination of bio-oil, combined with alcohol has not been reported.

As discussed previously, the esterification of bio-oil produces an upgraded product with improved properties. However, water content is increased significantly. Suggested methods to remove this water include utilization of molecular sieves as adsorbents. This method is likely to be prohibitively expensive, and recycling or disposal of utilized molecular sieve material may be problematic.

SUMMARY OF THE INVENTION

We have developed a method to esterify bio-oil followed by olefination or to simultaneously olefinate/esterify bio-oil to significantly upgrade the bio-oil as a fuel or as a biocrude. The water content of this olefinated product is dramatically reduced by this process, producing a fuel with HHV greater than 30. This upgraded product may be utilized as a boiler fuel, a turbine fuel or as a fuel to power a slow diesel, or as any combustion fuel for which a mildly upgraded bio-oil is adequate. It may also be utilized to produce hydrocarbons by hydrodeoxygenation. During hydrodeoxygenation the olefinated product has the potential to reduce hydrogen requirement and to result in significantly increased hydrocarbon yield due to reduced water content and the sharply decreased presence of chemical species known to coke catalysts during the hydrotreating or hydrocracking process. The upgraded olefination product is also miscible with petroleum crudes and may be blended with it to allow refinery processing of the combination.

The olefins which will work best for the olefination processes described are those which, on protonation by the acid catalyst, generate a tertiary carbonation. Numerous olefins are available in petroleum refinery streams. These include C4, C5, C6, C7 and C8 olefins. The olefins for addition can be obtained from current petroleum refinery byproduct streams. Furthermore, a typical refinery C4 cut, which contains isobutene, 1-butene, cis-2-butene and trans-2-butene, can be reacted directly in the process, and any unreacted C4 olefins can be recycled to other products. One such process reacts the linear butanes to isobutene, and this can be used to upgrade additional bio-oil.

Several benefits should result from olefination following bio-oil esterification or simultaneous alcoholation/olefination. Alcoholation of any specific bio-oil —OH group will lower polarity and raise heating value. However, each —OH addition to a C4-C8 olefin will have a much larger effect. Instead of adding only one carbon and two hydrogens (as when methylation occurs), the addition of a C4 olefin adds four carbons and eight new hydrogens. Moreover, C5-C8 olefins will have an even greater effect. Therefore, reaction of olefins with bio-oil will have a large and beneficial impact on raising the heating value, reducing hydrophilicity/polarity and increasing bio-oil compatibility with other hydrocarbon fuels.

The use of C2 and C3 olefins may also be beneficial. The respective C2 and C3 olefins, ethylene and propene, are gases at ambient temperature and pressure. These gases can be utilized in pressurized reactor systems such as autoclaves or pressurized packed-bed systems. The autoclaves may be heated and stirred, and the packed-bed reactors may be heated. Heterogeneous catalysts may be utilized to provide the catalytic reaction to olefinate previously esterified bio-oil or to catalyze the simultaneous esterification/olefination reaction for upgrading bio-oil by our novel method.

Application of Sonication, Microwave Excitation or Shear Mixing to Accelerate the Reaction Speeds of Esterification, Olefination/Esterification or TMAH Thermochemolysis Sonication has been applied to increase the esterification reaction speed for biodiesel production from vegetable oils or animal fats (Nurhan and Panning 2002). Malkamaki and Hintikka (2007) also disclose esterification of fats achieved by sonication or turbulence by several means to produce a biodiesel with no glycerin residue. However, bio-oil contains no fatty compounds, and the increased reaction time of bio-oil esterification of these fatty compounds by sonication or other turbulent means is not related to our esterification process in which fatty compounds are not present. No report of utilization of sonication for pretreatment of raw bio-oil to increase the esterification reaction has been reported. We have applied sonication successfully to decrease the esterification reaction time by 50%. We also demonstrated that the amount of required acid catalysis could be reduced by 50% to obtain the same degree of esterification as is provided by heating alone. In addition to sonication, microwave excitation or high-shear mixing will provide similar reduced reaction and catalyst requirements. These treatments also have the potential to accelerate, for the ambient pressure treatments described here, the olefination of esterified bio-oil, the olefination/esterification of combined alcohol and raw bio-oil, or the thermochemolysis of TMAH reacted with bio-oil. The percentage catalyst required for each reaction type should also be reduced based on our esterification reaction experimental results.

Utilization of Surfactants, Dispersants, TMAH or Ionic Liquids to Emulsify Alcohols with Bio-Oils and/or Olefins Prior to Performing the Reactions Comprising Our Invention Surfactants, dispersants, TMAH or ionic liquids can be incorporated with the alcohols, bio-oils and/or olefins to improve the reactions comprising our invention. These emulsive additions are obvious extensions of our technology current invention and are protected as such as our invention.

An objective of this invention is to produce esterified bio-oil by reduction of reaction time and with reduced catalyst addition. We disclose methods that cause bio-oil esterification reaction to proceed in less than half of the time required by previous methods by treating the bio-oil, alcohol and catalyst mixture so as to enlarge the border surface. This can be performed by sonication, microwave excitation or by mechanical high-shear mixing. In a preferred embodiment of this invention, a sonic signal is applied to raw bio-oil by a continuous-flow sonicator.

Sonication applied to the esterification process by our preferred embodiment acts to decrease catalyst requirement by 50% due to the increased chemical access to the molecular components of the bio-oil. The sonication-assisted esterification reduces the reaction time, as compared to a heat catalyzed reaction applied at a temperature of 60-80° C., from two hours to approximately one-half hour. This reduction in reaction time obtained by sonication, microwave application or high-shear mixing will result in the reduction of capital expense for a facility to apply the esterification process to less than 50% of that otherwise required. Catalyst costs will be reduced dramatically.

It is also an objective of this invention to produce esterified bio-oil in a pyrolysis reactor by spraying an alcohol mixed with an acid catalyst into the hot pyrolysis vapor stream just prior to condensation of said vapors. This method and device of our invention will allow rapid production of esterified bio-oil without utilization of other methods of traditionally applying catalysis.

It is an additional objective of this invention to produce an upgraded bio-oil with properties superior to the upgraded characteristics provided by esterification of bio-oil alone. Primary among these is increasing bio-oil stability above that provided by esterification alone. Producing a significant increase in bio-oil HHV and acid value are objects of this invention; reduction of bio-oil high viscosity and amelioration of the pungent bio-oil odor are all additional objects of this invention.

A final objective of this invention is to produce a pyroligneous bio-oil fraction with substantially reduced viscosity to provide for practical pumping into a hydrotreater. This esterification of bio-oil pyroligneous fraction, olefination of esterified pyroligneous fraction or simultaneous olefination/esterification of pyroligneous fraction may be practiced by any of the novel means described in this disclosure as being applied to bio-oil.

The objectives described above were all achieved by the method described herein to upgrade bio-oils by olefinating previously esterified bio-oil or by simultaneously olefinating/esterifying a mixture of bio-oil, alcohol, olefins and heterogeneous catalyst. Both processes can be catalyzed by a heterogeneous catalyst in a vessel heated for a period of time. Alternatively the olefination of esterified bio-oil or simultaneous olefination/esterification reaction may be achieved in a heated and pressurized high-pressure stirred batch autoclave with catalysis by a suitable heterogeneous catalyst. By our preferred method, the heterogenous catalyst applied is Ni—Si/Al. The same heterogeneous catalytic reaction can be applied in a continuous packed-bed reactor to produce a continuous production process. As previously described, the energy to catalyze the olefination/esterification reaction can also be performed by sonicating, microwaving or shear-mixing of the esterified bio-oil olefin mixture or by simultaneous olefination/esterification reaction of a bio-oil, alcohol, olefin and heterogeneous catalyst mixture. The olefination/esterification reaction may also be performed by spraying the required combination of bio-oil, alcohol and olefin mixture into the hot vapor stream of a pyrolysis reactor.

It is a particular object of the present invention to produce esterified and olefinated/esterified bio-oils with properties adequate to allow their combustion as a boiler, turbine, slow diesel or for any other purpose for which a mildly upgraded bio-oil provides adequate performance. It is also an object of the present invention to produce an upgraded olefinated/esterified bio-oil miscible with petroleum crude oil. The olefinated/esterified bio-oil can be refined via hydroprocessing alone or in combination with petroleum crude oil to form a hydrocarbon mixture suitable as a transportation fuel.

DETAILED DESCRIPTION OF THE INVENTION

The following drawings illustrate the preferred device and methods to obtain the bio-oil upgrading object of our invention. It is understood that there are many obvious methods and similar devices able to achieve this goal by various means. Therefore, these drawings are provided as examples of one means to achieve the objective of our goal without limiting our invention in any way.

Figure 1:
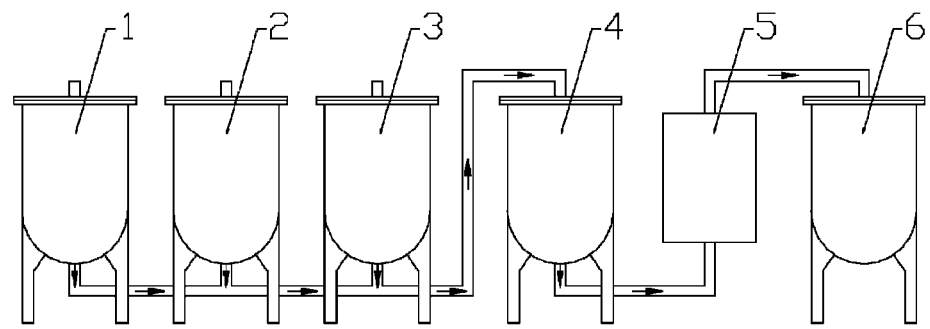
FIG. 1 depicts a schematic diagram of the production of esterified bio-oil by various reaction means.

As will be appreciated by the drawings, FIG. 1 is a schematic showing the equipment and process steps of the preferred esterification method and device of the present invention. Raw bio-oil from bio-oil storage tank 1 is input to a stirred tank 4. Alcohol from alcohol storage tank 2 is added to the stirred tank 4. An acid catalyst, preferably sulfuric acid from acid storage tank 3, is added to stirred tank 4. Stirred tank 4 briefly mixes the bio-oil, alcohol and acid catalyst mixture until complete homogenization of the ingredients is achieved. The mixed homogenized compound from stirred tank 4 is preferably input into a pyrolysis reactor 5 by spraying into the hot pyrolysis vapor stream. In an alternative embodiment, the pyrolysis reactor 5 may be replaced by a continuous sonicator, batch sonicator, microwave device or a high-shear mixer (all represented by the label 5 in FIG. 1). The rate of homogenized compound input through the pyrolysis reactor 5, continuous sonicator, batch sonicator, microwave device or high-shear mixer is dependent of the time required to ensure that the esterification is complete. The esterified bio-oil is transferred to an esterified bio-oil storage tank 6 for subsequent shipment.

Figure 2:
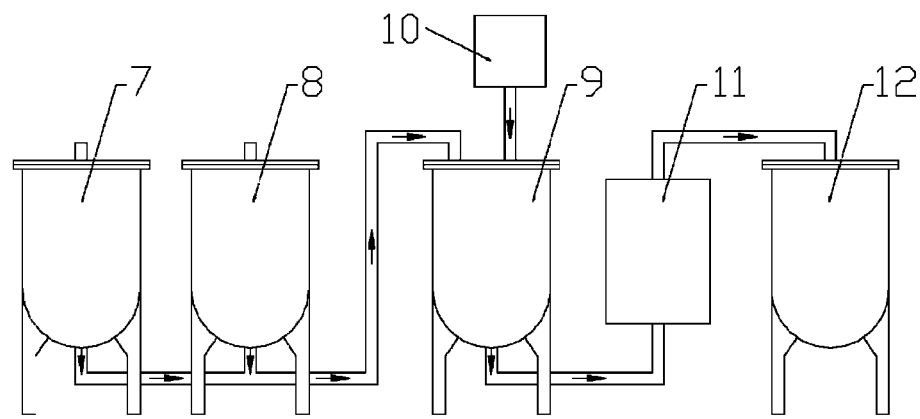
FIG. 2 depicts a schematic diagram of the production of olefination of esterified bio-oil by various reaction means.

FIG. 2 is a schematic showing the equipment and process steps of the preferred olefination of esterified bio-oil. The method of production may be by heating over time in a stirred vessel; reaction in a batch or continuous sonicator, microwave excitation device, or high-shear mixer; or reaction by injection into a pyrolysis vapor stream of a pyrolysis reactor of any type.

Previously esterified bio-oil from esterified storage tank 7 is input to a stirred tank 9. Olefins from olefin storage tank 8 are input to stirred tank 9. A heterogenous catalyst 10 is added to stirred tank 9. Stirred tank 9 briefly mixes the esterified bio-oil, olefin and heterogeneous catalyst mixture until complete homogenization of the ingredients is achieved. Ingredients of stirred tank 9 can be heated in a vessel at ambient pressure, injected into a pyrolysis reactor, sonicator, microwave excitation device or high-shear mixer 11. The olefinated/esterified bio-oil is transferred to an olefinated/esterified bio-oil storage tank 12 for subsequent shipment.

Figure 3:
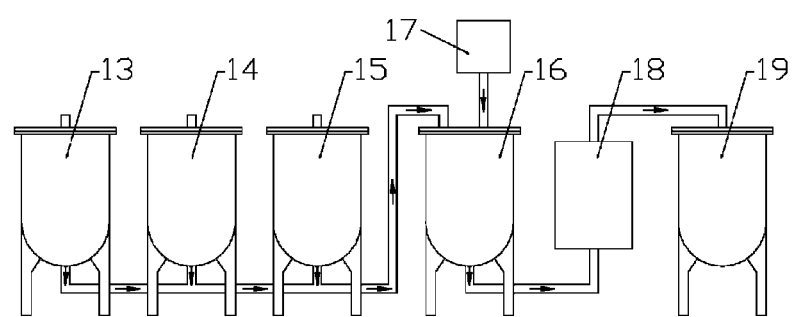
FIG. 3 depicts a schematic diagram of the production of simultaneous olefinated/esterified bio-oil by various reaction means.

FIG. 3 is a schematic showing the equipment and process steps of the preferred simultaneous olefination/esterification of bio-oil. The method of production may be by heating over time in a stirred vessel; reaction in a batch or continuous sonicator, microwave excitation device, or high-shear mixer; or reaction by injection into a pyrolysis vapor stream of a pyrolysis reactor of any type. Bio-oil from bio-oil storage tank 13 is input to a stirred tank 16. Alcohol is also input from alcohol storage tank 14 to stirred tank 16. Likewise, olefins from olefin storage tank 15 are also input to stirred tank 16. A heterogeneous catalyst 17 is added to stirred tank 16. Stirred tank 16 briefly mixes the bio-oil, alcohol, olefin and heterogeneous catalyst mixture until complete homogenization of the ingredients is achieved. Ingredients of stirred tank 16 can be heated in a vessel at ambient pressure, injected into a pyrolysis reactor, sonicator, microwave excitation device or high-shear mixer 18. The olefinated/esterified bio-oil is transferred to a storage tank 19 for subsequent shipment.

Figure 4:
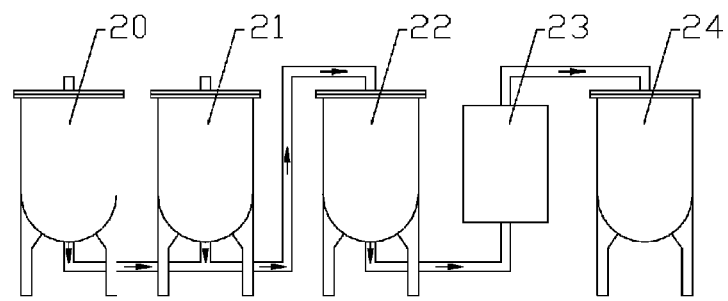
FIG. 4 depicts a schematic diagram of the production of TMAH/alcohol reaction bio-oil by various reaction means.

FIG. 4 is a schematic showing the equipment and process steps of the preferred method and device for reaction of TMAH with bio-oil. The method of production may be by heating over time in a stirred vessel; reaction in a batch or continuous sonicator, microwave excitation device, or high-shear mixer; or reaction by injection into a pyrolysis vapor stream of a pyrolysis reactor of any type. Bio-oil from bio-oil storage tank 20 is input to a stirred tank 22. A TMAH alcohol mixture is stored in TMAH—alcohol tank 21. This mixture is also input to stirred tank 22. Stirred tank 22 briefly mixes the bio-oil plus TMAH alcohol mixture until complete homogenization of the ingredients is achieved. Ingredients of stirred tank 22 can be heated in a vessel at ambient pressure, injected into a pyrolysis reactor, sonicator, microwave excitation device or high-shear mixer 23. The olefinated/esterified bio-oil is transferred to a olefinated/esterified bio-oil storage tank 24 for subsequent shipment.

Figure 5:
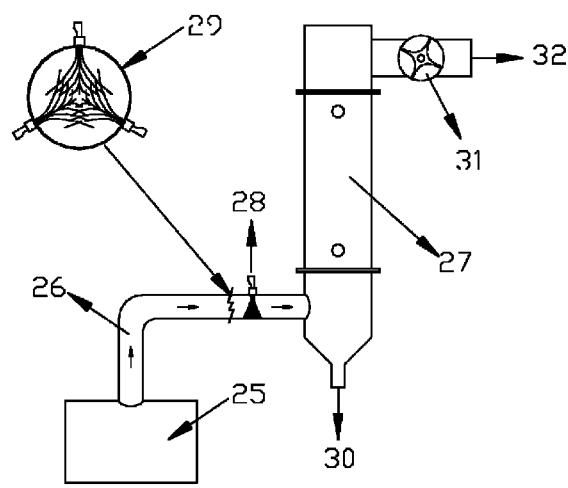
FIG. 5 depicts a schematic of the pyrolysis reactor injection device location showing the cross pipe for passage of the pyrolysis vapors to the reactor; the injection point of the cross pipe is shown in its location just prior to entry of the pyrolysis vapors into the condenser train.

FIG. 5 is a schematic showing elements of a pyrolysis reactor involved in spraying an alcohol acid catalyst mixture; TMAH/alcohol mixture; esterified bio-oil, olefins and heterogeneous catalyst mixture; or bio-oil, alcohol, olefins and heterogeneous catalyst mixture into the hot pyrolysis vapor stream of a pyrolysis reactor 25. Biomass is pyrolyzed in any type of pyrolysis reactor 25 with the pyrolysis reactor producing bio-oil vapors that pass through a heated pipe 26 into the condenser(s) 27 that will rapidly condense the treated vapor stream. Just prior to entry into the condenser, or condensers, as any number of condensers may be employed, a device 28 for spraying fine droplets, produced by any means, injects the alcohol acid catalyst or TMAH alcohol mixture into the hot pyrolytic vapor stream. In a preferred embodiment, the means for producing fine droplets includes applying three spray nozzles 29 in an equidistant array around the circumference of the pipe carrying hot pyrolysis vapors. Any number of spray nozzles may be employed for this purpose. The fine spray produced by the nozzle(s) reacts with the pyrolysis vapors to produce condensed esterified bio-oil 30. An optional vacuum pressure device 31 may be utilized to induce a vacuum at the exit pipe 32 carrying the non-condensable gases from the condenser(s) 27. The non-condensable exit gases exit the pyrolysis system and may be released to the atmosphere or utilized in any way.

Figure 6:
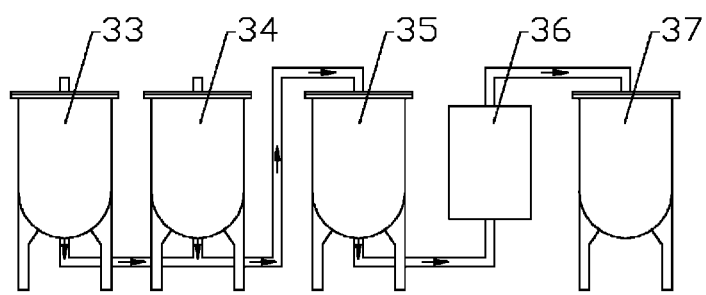
FIG. 6 depicts a schematic diagram of the production of olefination of esterified bio-oil in a high-pressure batch or continuous autoclave reaction bio-oil by various reaction means.

FIG. 6 is a schematic showing the equipment and process steps of the preferred method and device for olefination of esterified bio-oil in a high-pressure batch or continuous autoclave. The autoclave will be heated and under pressure with the reaction catalyzed with a heterogeneous catalyst. Esterified bio-oil from bio-oil storage tank 33 is input to a stirred tank 35. Olefins from olefins storage tank 34 are also input to stirred tank 35. Stirred tank 35 briefly mixes the esterified bio-oil plus olefins until complete homogenization of the ingredients is achieved. Ingredients of stirred tank 35 are then input to a batch or continuous autoclave 36 containing a heterogeneous reactor to catalyze the reaction. The olefinated/esterified bio-oil is transferred to a storage tank 37 for subsequent shipment.

Figure 7:
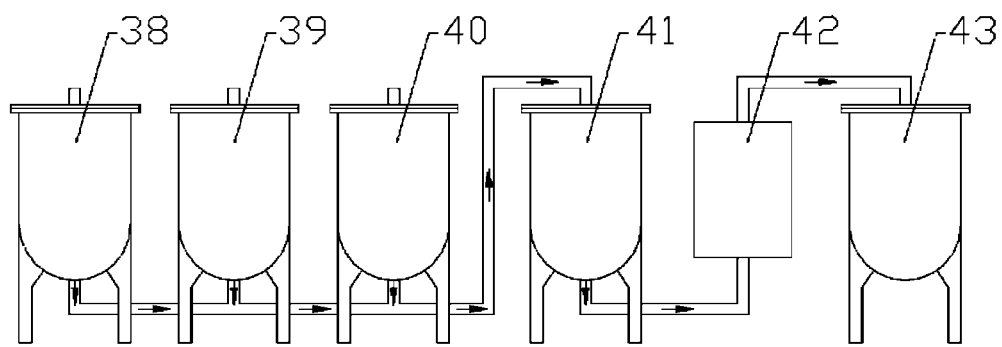
FIG. 7 depicts a schematic diagram of the production of simultaneous olefination/esterification of bio-oil in a high-pressure batch or continuous autoclave reaction bio-oil by various reaction means.

FIG. 7 is a schematic showing the equipment and process steps of the preferred method and device for simultaneous olefination/esterification of bio-oil in a high-pressure batch or continuous autoclave. The autoclave will be heated and under pressure with the reaction catalyzed. Bio-oil from storage tank 38 is input to stirred tank 41. Alcohol from storage tank 39 and olefins from storage tank 40 are also input to stirred tank 41. Stirred tank 41 briefly mixes the bio-oil plus alcohol and olefins until complete homogenization of the ingredients is achieved. Ingredients of stirred tank 41 are then input to a batch or continuous autoclave 42 containing a heterogeneous reactor to catalyze the reaction. The olefinated/esterified bio-oil is transferred to an olefinated/esterified storage tank 43 for subsequent shipment.

EXAMPLES

The following examples are intended to illustrate the present invention without limiting the invention in any way.

Example 1

Esterification by Injection of Sprayed Alcohol/Catalyst into the Hot Pyrolytic Vapor Stream Loblolly pine feedstock containing approximately 10% moisture content was pyrolyzed in a laboratory-scale auger reactor capable of producing 3 liters of bio-oil per hour. Pyrolysis temperature applied was 450° C. During pyrolysis, methanol combined with acid catalyst was injected by spraying into the cross pipe connected to the main reactor tube in which pyrolysis was performed. The function of the cross pipe is to carry pyrolysis vapors from the main reactor tube to the condenser train. An injection system was positioned in the cross pipe just before entry of the pyrolysis vapors into the condenser. Methanol was sprayed into the hot pyrolysis vapor stream utilizing a fuel injector nozzle with flow rate controlled by an HPLC pump with controller. A pressure of approximately 5 psi was applied to the methanol/catalyst mixture with a syringe pump. Both the pump and fuel injector were calibrated in the laboratory with the methanol prior to the attachment to the cross pipe. The flow rate was calculated based on the weight of the methanol injected over the time period. A linear calibration formula was determined to quantify the amount of methanol actually injected. The planned injection rate of methanol was based on a 2 kg/hr production rate of bio-oil. The actual production rate of bio-oil was actually higher than 2 kg/hr and was determined by weight during each experiment. The actual percentage of methanol was lower than the pre-run estimates.

The actual amounts of methanol injected were 0.5, 1.1, 2.7, 6.0 and 11.9% corresponding to the estimated respective percentages of 1, 2, 5, 10 and 20% of methanol. Yields of bio-oil were 67.5, 66.8, 57.7, 57.6 and 59.7% for respective nominal percentage methanol injections of 20, 10, 5, 2, and 1%. Differences in yield were not considered to be related to level of methanol injected.

Chemical and physical tests were performed to evaluate the characteristics of the injected alcohols. For methanol, Table 1 summarizes the GC/MS analysis results showing that the major esterification products were methyl acetate and methyl hydroxyacetate which were converted from acetic acid and hydroxyacetic acid, respectively. Table 2 gives the area percentage values from the GC/MS identification of chemical species. These results show that for 10 and 20% methanol injection, both methylacetate and hydroxyl methylacetate formed as a result of the esterification reaction. Significantly higher amounts of these esterification products were produced for the higher 20% methanol injection. The zero amount of these esters in the raw bio-oil is the expected result as no esterification products are present in raw bio-oil. The zero yields of these compounds for the 1, 2 and 5% methanol injections indicate that a critical amount of methanol must apparently be injected into the pyrolytic vapor stream in order to initiate the esterification reaction to the degree required to obtain ester in the upgraded bio-oil.

TABLE 1

Area percentage values from the GC/MS identification of esters in bio-oil resulting from esterification by spraying an alcohol/catalyst mixture into the pyrolysis vapor stream.

| Pyrolysate liquid | Area % | |
|---|---|---|
| | Methylacetate | Hydroxy methylacetate |
| 20% methanol injection | 3.76 | 1.17 |
| 10% methanol injection | 0.50 | 0.64 |
| 5% methanol injection | 0 | 0 |
| 2% methanol injection | 0 | 0 |
| 1% methanol injection | 0 | 0 |
| Raw bio-oil | 0 | 0 |

Table 2 gives the percent water, acid value and density of pine wood pyrolysis oil injected with methanol and methanol/sulfuric acid catalyst. These results indicate that water content in the methanol injected bio-oils had significantly higher water content than raw bio-oil. This is the expected result as esterification results in production of water from the reaction. The acid values were lowered for each of the treated bio-oils with a clear trend of reduction from the 99.8 value for raw bio-oil to 81.9 for 20% methanol injection. Again, this result is expected as esterification of acids is the main reaction produced by alcoholation of bio-oil. Density was also decreased consistently from the value of 1.23 g/ml for raw bio-oil to 1.13 g/ml for 20% methanol injection. This density value substantiates the later viscosity values that show the same consistent decrease proportional to percentage methanol injected.

TABLE 2

Methanol injected and raw bio-oil values for water content, acid value and density.

| | Physical Property | | |
|---|---|---|---|
| Raw and treated bio-oils | Water content (%) | Acid value | Density (g/ml) |
| 20% methanol injection | 23.1 | 81.9 | 1.13 |
| 10% methanol injection | 22.2 | 84.0 | 1.16 |
| 5% methanol injection | 25.1 | 89.4 | 1.15 |
| 2% methanol injection | 22.8 | 91.9 | 1.17 |
| 1% methanol injection | 24.0 | 96.0 | 1.20 |
| Raw bio-oil | 21.9 | 99.8 | 1.23 |

Both treated and raw bio-oil specimens were subjected to accelerated aging. The accelerated aging procedure involved submersion of specimens in a water bath at 90° C. for five days. Table 3 results show that methanol injection had a large impact in reducing bio-oil viscosity during aging. Raw bio-oil increased in viscosity from 15.45 to 24.65 cSt which represents a 60% increase. Viscosity increased similarly for the bio-oils treated with 1 and 2% methanol injections. However, viscosity increases for the nominal 10 and 20% levels of methanol injection were insignificant following aging.

TABLE 3

Viscosity changes, before and after accelerated aging at 90° C. for 5 days, for raw bio-oil and for bio-oil upgraded by injection of methanol at various levels into the pyrolytic vapor stream during pyrolysis.

| | Viscosity (cSt) | |
|---|---|---|
| Raw and treated bio-oils | Unaged | Aged for 5 days at 90° C. |
| 20% methanol injection | 6.23 | 6.05 |
| 10% methanol injection | 8.87 | 8.93 |
| 5% methanol injection | 8.26 | 8.52 |
| 2% methanol injection | 12.17 | 20.82 |
| 1% methanol injection | 12.56 | 22.34 |
| Raw bio-oil | 15.45 | 24.65 |

Flash point of the bio-oil indicated the lowest temperature at which the vapors of the bio-oil start to ignite. Difficulty of ignition is one of the negative qualities of bio-oil. The ignition value of the raw bio-oil was 52 while the values for the treated bio-oils were 46, 46, 42, 34 and 32 for nominal percentages of 1, 2, 5, 10 and 20% methanol injection, respectively. These results show that reduction of ignition temperature was consistent and roughly proportional to level of methanol injection. For 20% methanol injection, the flash point was reduced by 38%.

Example 2

Bio-Oil Methanolysis with Addition of Methanol and TMAH as Catalyst

A thermochemolytic reaction was performed with the addition of methanol at 15 wt % combined with 5 wt % TMAH (the weight percents given are percentages of the total bio-oil/methanol/TMAH mixture). In one experiment, the mixture was stirred briefly and allowed to stand for 24 hours. For a second experiment, the combined TMAH and alcohol were mixed briefly and then injected by spraying into the vapor stream of the pyrolysis reactor. Table 4 shows the results of the physical and chemical analyses performed. For this method, water content was 26.9 and 25.9% respectively for the treated bio-oil products, as compared to the 21.9% value for the raw bio-oil. These increased water content values were the expected result as both TMAH and methanol addition produce water from their respective reactions with bio-oil. Acid values for the treated bio-oil were nearly identical at 58.9 and 59.1; these values represented a nearly 40% reduction as compared to the untreated raw bio-oil acid value of 99.8. Viscosity was also reduced by nearly 40% from similar 9.21 and 9.79 values for the treated bio-oils as compared to the untreated raw bio-oil value of 15.45%. Flash point decreased by more than 30% for the treated bio-oils, from 35 and 36, as compared to the value of 52 for raw bio-oil. These results show that there is no significant difference between the products produced from the injection method, as compared to the pot reaction method at room temperature. Also, the improvement in bio-oil quality by both of these methods of upgrading was greatly improved as measured by the demonstrated improvements in the important measures of acid value, viscosity and flash point. While water content was significantly increased by about 20% for both upgrading reactions, the final HHVs of the treated products were increased 18.07 and 17.95, as compared to 14.95 for the raw bio-oil.

TABLE 4

Physical values of raw bio-oil compared to those for methanol/TMAH injected and methanol/TMAH room-temperature reacted products.

| Treated and raw bio-oils | % H$_2$O | Acid value | Viscosity | Flash point | Heating value (MJ/Kg) |
|---|---|---|---|---|---|
| Bio-oil treated at room temperature | 26.9 | 58.9 | 9.21 | 35 | 18.07 |
| Bio-oil treated by spraying | 25.9 | 59.1 | 9.79 | 36 | 17.95 |
| Raw bio-oil | 21.9 | 99.8 | 15.45 | 52 | 14.95 |

Example 3

Simultaneous Esterification and Olefination at 120° C. Temperature with Resin Acid Catalyst Simultaneous olefination/esterification was performed with 1 butanol added as the alcohol and 1-octane added as the olefin. Bio-oil comprised 66.7%, 1-octene 11.1% and butanol 22.2% of the total mixture to be reacted with 5% addition of Dowex50WX2. The reaction was performed at 120° C. for 3 h. No charring or coking was observed as a result of this reaction. A single phase liquid resulted from the reaction as opposed to two-phase reactions produced by previous research when the reaction was performed in the absence of alcohol.

Results of the GC/MS analysis of the raw bio-oil are given in Table 5 with the analysis for the olefinated product provided in Table 6. These tabular results are given as area percents based on the total ion current. Table 4 shows that oxygen-containing organic components of raw bio-oil involve many classes such as anhydrosugars, carboxylic acids, alcohols, phenols, aldehydes, ketones, esters and furans. The most abundant organic component in raw bio-oil was levoglucosan (1,6-anhydro-β-D-Glucopyranose). Its peak area is shown as about 45%, the largest percentage of the oxygenated organic components present. This broad peak may also contain some related anhydro-monosaccharides.

In the raw bio-oil GC/MS results provided in Table 5, the organic acids were abundant, including formic acid, acetic acid, propanoic acid, butanoic acid, butanedioic acid, etc. Acetic acid is typically the most abundant acid in raw bio-oil, accounting for more than 8% of the peak area. Raw bio-oil contains phenol and many phenol derivatives with methyl, propenyl, ketone, and aldehydes groups attached. These phenolic compounds form by lignin decomposition, and the sum of their corresponding peak areas was higher than 10%. The typical ketones include 1-hydroxy-2-butanone, 3-methyl-1, 2-cyclopentanedione, 2,2-dimethyl-3-heptanone, 4-ethoxy-cyclohexanone and 2-methyl-cyclopentanone. Alcohols represented about 11% of the peak areas and included abundant 1,2,3-propanetriol, with 2,3-dimethyl-cyclohexanol and 1,2,3,4-butaneteraol also observed. Furan derivatives with good fuel properties such as 3,4-dimethyl-2,5-dihydrofuran, 2,5-dimethylfuran, 2,5-dimethoxytetrahydrofuran, 2-hydroxy-1-methoxy-ethylfuran and 2(5H)-furanone were also detected. The esters contained in raw bio-oil included hexanedioic acid's monomethyl ester and 2-propyltetrahydropyran-3-yl acetate. Some other compounds contained in raw bio-oil include 2-(2-propenyl)-1,3-dioxolane, 2,2-dimethoxypropane and 2,3-dihydroxy-1,4-dioxane. This last compound is the cyclic dimmer hemiacetal of hydroxyacetaldehyde.

Table 6 gives the GC/MS analysis of this upgraded alcoholated/olefinated product. Following upgrading, most of the organic acids (formic acid, acetic acid, propanoic acid, butanoic acid, butanedioic acid, etc.) were converted into butyl or octyl esters via esterification with 1-butanol and octanols (product of 1-octene plus water) and by carboxylic acid additions across 1-octene. As many as 30 of these esters were formed, accounting for more than 25% of the total corresponding peak area. This total exceeds that of either residual 1-butanol (15.22%) or 1-octene (22.45%). Typical esters formed from 1-butanol included butyl formate, butyl acetate, butyl propionates, butyl levulinate, butyl hydroxyacetate, the monobutyl ester of butanedioic acid, butyl 2-hydroxypropanoate, and dibutyl butanedioate. 2-Octanol and 3-octanol were formed by hydration of 1-octene and 2-octene, respectively. Four octane isomers were observed after the reactions, including 1-, 2-, 3-, and 4-octene, but no oligomeric or fragmented olefins from octenes were detected. A variety of isomeric octyl esters were formed from the isomeric octenes and octanols, including octyl acetates, octyl propionates and octyl butanoates. 2,2-Diemthoxypropane was detected in both raw bio-oil and in a diminished concentration in upgraded bio-oil. 2,2-Dimethoxypropane originates from acetone and methanol, either from small amounts added to the bio-oil directly after it is condensed from wood flour pyrolysis (for stabilization) or methanol which is used as the solvent for GC/MS analysis. Other acetals detected in this upgraded bio-oil included formaldehyde and acetaldehyde dibutyl acetals and 1,1-dibutoxy-2-propanone. These were generated from acetal-forming equilibria with formaldehyde, acetaldehyde and methylglyoxal, respectively, with 1-butanol.

Phenolic compounds present in raw bio-oil, such as phenol, 2-methylphenol, 2-methoxyphenol, 2-methoxy-4-methyl phenol, etc., were detected in diminished amounts in upgraded bio-oil. Furthermore, the phenolic derivatives 1,2-benzenediol, 2-methoxy-5-propenyl phenol, and 4-hydroxy-3-methoxybenaldehyde (vanillin) present in raw bio-oil could not be detected in upgraded bio-oil. Small quantities of various octyl-substituted phenols were detected, suggesting that phenolic O- and C-alkylation reaction with the isomeric octenes had taken place. Absolute structural identification of these compounds, however, was not possible since their authentic standards were not available.

Although small amounts of 2(5H)-furanone, 5-propyl-2 (3H)-dihydrofuranone and 2,3-dihydro-2,5-dimethylfuran were found in upgraded bio-oil, both the number and content of these furan derivatives decreased after upgrading treatment. The drop in concentration or elimination of several active phenol and furan derivatives will increase stability and hydrocarbon blending ability of the upgraded bio-oil. The amounts of hydroxyl butanones, 2-methyl-cyclopentanone and 2,2-dimethyl-3-heptanone decreased in the upgraded bio-oil. Some ketones such as 3-methyl-1,2-cyclopentanedione, 4-ethoxycyclohexanone and 4-hydroxy-3-methyl-2-butanone, which exist in raw bio-oil, totally disappeared after upgrading. Some new ketones appeared including 2-cyclopenten-1-one, 2-hydroxy-1-methylcyclopenten-3-one, and 2-allyl-2-methyl-1,3-cyclopentanedione, etc. Levoglucosan's concentration decreased dramatically during upgrading from more than 40 area % to less than 0.5 area %. This was accompanied by formation of some amounts of galactopyranose methyl glycoside, methyl-beta-D-glucopyranoside and methyl glucose ether and, probably, their butyl analogs.

It is also interesting that the polyhydric alcohols content decreases dramatically. Glycerin, a major component of this raw bio-oil, and 1,2,3,4-butanetetraol concentrations drop to a combined area percent of only 0.41% after upgrading from 12 area % before this treatment. This would lower the viscosity and hydrophilicity of the product. Traces of 1-butoxyethanol and butoxyacetic acid were also detected in the upgraded bio-oil. These form from reactions of 1-butanol with acetaldehyde and hydroxyacetic acid, respectively.

It is apparent that hydration of olefins, esterifications of organic acids, and acetalations of aldehydes and ketones and O- and C-alkylations of phenolic compounds occur to varying extents simultaneously during 1-octene/1-butanol upgrading. The amounts of esters sharply increased, while the amounts of levoglucosan, other anhydro-sugars, monosaccharides, carboxylic acids and polyhydric alcohols decreased.

TABLE 5

Selected organic oxygen-containing components of raw bio-oil.

| Components | Area | Components | Area % |
|---|---|---|---|
| Acids | | Alcohols | |
| Glyoxylic acid | 0.19 | Glycerin | 11.17 |
| Formic acid | 1.16 | 1,2,3,4-Butanetetrol | 0.59 |
| Acetic acid | 8.84 | 2,3-Dimethylcyclohexanol | 0.18 |
| Propanoic acid | 1.70 | 3-Methoxy-1,2,4-butanetriol | 0.03 |
| Butanedioic acid | 0.41 | Esters and Acetals | |
| 2-Hydroxy-3-methoxy-succinic acid | 0.17 | 2,2-Dimethoxypropane | 0.1 |
| D-Araboascorbin acid | 0.20 | Hexanedioic acid, monomethyl ester | 0.58 |
| Phenols | | Acetic acid, 2-propyltetrahydropyran-3-yl ester | 1.49 |
| Phenol | 0.59 | Furans | |
| 2,Methylphenol | 0.22 | 2,5-Dimethylfuran | 0.92 |
| 3-Methylphenol | 0.37 | (2,Hydroxy-1-methoxy) ethylfuran | 0.18 |
| 2-Methoxyphenol | 2.33 | 2(5H)-Furanone | 0.41 |
| 2,6-Dimethylphenol | 0.26 | 2,3-Dihydro-2,5-dimethylfuran | 0.08 |
| 2-Methoxy-4-methylphenol | 3.44 | 2,5-Dimethoxytetrahydrofuran | 0.05 |
| 1,2-Benzenediol (catechol) | 0.98 | Sugars | |
| 4-Ethyl-2-methoxyphenol | 0.75 | D-Arabinitol | 0.17 |
| 2-Methoxy-5-propenylphenol | 0.73 | 1-Deoxy-d-arabitol | 0.33 |
| 2-Methoxy-4-propylphenol | 0.15 | 2-Deoxy-d-galactose | 0.54 |
| 1-(4-Hydroxy-3-methoxyphenyl)-2-propanone | 0.56 | 2,2-Dimethyl-3-heptanone | 0.60 |
| 4-(3-Hydroxy-1-propenyl)-2-methoxyphenol | 0.17 | 3-Deoxyglucose | 0.13 |
| 5-Hydroxy-6-methoxy-1-benzofuran-3(2H)-one | 0.09 | 1,4:3,6-Dianhydro-α-d-glucopyranose | 0.43 |
| Ketones and aldehydes | | 2,3-Andydro-d-galactosan | 0.69 |
| 3-Hydroxy-2-butanone | 0.08 | 2,3-Anhydro-d-mannosan | 0.33 |
| 1-Hydroxy-2-butanone | 0.46 | 3,4-Anhydro-d-galactosan | 1.93 |
| 4-Hydroxy-3-methyl-2-butanone | 0.64 | D-Allose | 1.46 |
| 2-Methyl-cyclopentanone | 0.14 | 1,6-Anhydro-β-D-glucopyranose (levoglucosan) | 44.13 |
| 3-Methyl-1,2-cyclopentanedione | 1.45 | d-Glycero-d-galacto-heptose | 0.35 |
| 2,2-Dimethyl-3-heptanone | 0.60 | d-Glycero-d-ido-heptose | 0.23 |
| 4-Ethoxy-cyclohexanone | 0.17 | Diacetonyl-d-mannosan | 0.26 |
| 4-Hydroxy-3-methoxy-benzaldehyde | 0.33 | Others | |
| 4-Hydroxy-2-methoxycinnamaldehyde | 0.20 | 2,3-Dihydroxy-1,4-dioxane | 2.01 |
| 2,3-Methylenedioxyanisole | 0.26 | 2-(2-Propenyl)-1,3-dioxolane | 0.38 |
| Hexanedial | 0.33 | Octahydro-4a(2H)-naphthalenecarboxylic acid | 2.28 |

TABLE 6

Selected organic oxygen-containing components of bio-oil upgraded with
1-octene/1-butanol at 120° C. for 3 h.

| Components | Area | Components | Area % |
|---|---|---|---|
| Acids | | Esters | |
| Glyoxylic acid | 0.20 | n-Butyl formate | 3.65 |
| Acetic acid | 1.57 | n-Butyl acetate | 11.34 |
| Propanoic acid | 0.11 | n-Butyl propanoate | 1.89 |
| 4-Pentenoic acid | 0.09 | n-Butyl butanoate | 0.94 |
| Butoxyacetic acid | 0.02 | n-Butyl-2-hydroxypropanoate | 0.35 |
| 2-Pentenoic acid | 0.08 | n-Butyl hydroxyacetate | 1.28 |
| Phenols | | n-Butyl pentanoate | 0.44 |
| Phenol | 0.17 | n-Butyl hexanoate | 0.13 |
| 2,Methylphenol | 0.07 | n-Butyl levulinate | 1.91 |
| 3-Methylphenol | 0.22 | Octyl acetates | 1.12 |
| 2-Methoxyphenol | 0.65 | n-Butyl acetoacetate | 0.25 |
| 2,6-Dimethylphenol | 0.10 | Octyl propenoates | 0.37 |
| 1-Ethyl-3-hydroxybenzene | 0.06 | Octyl butanoates | 1.07 |
| 2-Methoxy-4-methylphenol | 0.71 | Octyl pentanoates | 0.46 |
| 1-(4-Hydroxy-3-methoxyphenyl)-ethanone | 0.54 | n-Butyl butanedioate | 0.59 |
| 1-(4-Hydroxy-3-methoxyphenyl)2-propanone | 0.26 | 2,2-Dimethyl-3-hexanol acetate | 1.71 |
| Octyl derivatives of phenol and substituted phenol | 1.14 | Dibutyl butanedioate | 1.1 |
| Ketones and aldehydes | | Dibutyl butanedioate | 0.38 |
| 5-Methoxy-2-pentanone | 0.05 | Octyl acetoacetate | 0.29 |
| 1-Hydroxy-2-butanone | 0.02 | Cyclopentyl-2,2-dimethylpropioate | 1.71 |
| 2-Cyclopenten-1-one | 0.12 | Acetals | |
| 2-Methylcyclopentanone | 0.07 | 2,2-Dimethoxypropane | 0.29 |
| 2-Hydroxy-1-methylcyclopenten-3-one | 0.54 | 2,2-Dimethoxybutane | 0.17 |
| 2,2-Dimethyl-3-heptanone | 0.03 | Formaldehyde dibutyl acetal | 0.50 |
| 3-Ethyl-2-hydroxy-2-cyclopenten-1-one | 0.06 | Acetaldehyde dibutyl acetal | 0.11 |
| 2-Allyl-2-methyl-1,3-cyclopentanedione | 0.10 | 1,1-dibutoxyacetone | 1.15 |
| Alcohols | | Iso-Valeraldehyde propyleneglycol acetal | 0.16 |
| 1-Butanol | 15.13 | Furans | |
| Glycerin | 0.39 | 2,3-dihydro-2,5-dimethylfuran | 0.04 |
| 1,2,4-Butanetriol | 0.03 | 2(5H)-Furanone | 0.11 |
| 3-Cyclopentene-1,2-diol | 0.11 | Dihydro-5-propyl-2(3H)-Furanone | 0.08 |
| 1,2,3,4-Butanetetrol | 0.02 | 1-(2-Furyl)-1,2-butanediol | 0.27 |
| 2-Octanol | 0.15 | Others | |
| 3-Octanol | 0.23 | 2,3-Dihydroxy-1,4-dioxane | 0.06 |
| 2,2-Dimethyl-3-hexanol | 0.11 | Toluene | 0.30 |
| Sugars | | Octahydro-4a(2H)-naphthalenecarboxylic | 2.30 |
| 2-Deoxy-D-arabinose | 0.17 | 2-n-Butoxyethanol | 0.09 |
| 1,5-Anhydro-d-talitol | 0.90 | 2-Ethyldecahydronaphthalene | 0.10 |
| 1,5-Anhydro-d-mannitol | 0.27 | 1-Dodecane | 12.91 |
| 1,6-Anhydro-β-D-glucopyranose | 0.24 | 1-Octene | 18.88 |
| α-D-Galactopyranose methyl glycoside | 3.76 | 4-Octene | 0.19 |
| Methyl-β-D-glucopyranoside | 2.02 | 3-Octene | 0.10 |
| α-Methyl D-glucose ether | 1.68 | 2-Octene | 0.02 |

TABLE 7

Fuel properties of raw bio-oil and bio-oil upgraded with 1-octene/
1-butanol over Dowex50WX2 for 3 h at 120° C.

| Properties | Raw Bio-oil | 120° C. |
|---|---|---|
| Water content (wt. %) | 37.19 | 7.385 |
| HHV (MJ-kg$^{-1}$) | 12.55 | 29.77 |
| pH value | 2.62 | 3.47 |
| C (%) | 32.08 | 61.05 |
| H (%) | 8.09 | 10.55 |
| O (%) | 59.71 | 28.18 |
| N (%) | 0.11 | 0.22 |

Some representative properties of raw bio-oil versus upgraded bio-oil are summarized in Table 7. Although the appearance of upgraded bio-oil was similar to that of raw bio-oil, the odor changed noticeably from an unpleasant heavy smoke-like aroma to a banana-like fragrance. This change is due to three key transformations. First, the formation of butyl esters from the organic acids present in raw bio-oil causes a very typical sweet, fruity smell that resembles bananas. The formation of large amounts of butyl acetate occurred. Secondly, the reduction in the amount of malodorous phenolic compounds like quiacol and methyl phenols has occurred, in part by O-alkylations by olefins. Third, the amount of levoglucosan, which has a smoky aroma, decreased.

The water content of the bio-oil upgraded with 1-octene/1-butanol (bio-oil, 1.5 g; 1-octene, 0.6 g; 1-butanol, 0.75 g) was reduced from 37.2% to <7.385%. This decrease is due to the addition of water across 1-octene (or other olefins). Upon olefin protonation, water can rapidly react at the carbocation center forming alcohols. The reduction of water is especially noteworthy because many of the upgrading reactions generate more water in the bio-oil. Acetal and ester formation generate a mole equivalent of water. Alcohol conversions to ethers generate water. These reactions add water to the already large amounts of water in raw bio-oils. In particular, large amounts of water were formed during esterifications in these upgrading reactions.

The Table 7 raw bio-oil pH was 2.62 compared to 3.47 for the upgraded alcoholated/olefinated product. The esterification/olefination reactions increased the HHV value of the raw bio-oil from 12.55 to 29.77 for the upgraded product.

Example 4

Simultaneous Olefination/Esterification in a High-Pressure Autoclave

An experiment was performed to simultaneously olefinate/esterify bio-oil in a batch stirred autoclave. Temperature applied was 250° C. with pressure of 100 psi. A mixture of bio-oil (85.7%), butanol (28.6%) and 1-octene (14.3%) was catalyzed with 5 wt % of nickel on silica alumina (Ni—Si/Al) catalyst. Ni—Si/Al catalyst was selected as a highly acidic catalyst utilized in past practitioners for olefination and isomerization. It is obvious that other acid catalysts could be applied to catalyze this reaction, and it is understood that any appropriate catalyst of this type is an obvious extension of our technology. It is also clear that this reaction could be performed in a continuous packed bed reactor in an obvious extension of our invention.

The reaction was performed for a period of 2 hours with the treated bio-oil allowed to cool in the reactor. The mixture was centrifuged for 2 hours to separate the resulting aqueous and organic phase resulting from the reaction. After centrifugation, the less dense (0.95 g/ml) organic phase was clearly separated from the aqueous phase and floated on the surface of the 1 g/l density water. The organic phase removed with a separating funnel by gravity. Both the aqueous and organic fractions were analyzed chemically and physically.

Table 8 gives the GC/MS analysis of this upgraded alcoholated/olefinated product which can be compared to the previously referenced Table 5 GC/MS analysis values for raw bio-oil. As for the reaction results produced by a different method, as described above in Example 3, most of the organic acids were converted into butyl or ethyl or methyl esters via esterification with 1-butanol and octanols. The GC/MS analysis of the olefinated/esterified product of the current example identifies 17 esters. These 17 esters comprised more than 22% of the total area % described in the GC/MS results. This 22% area % of esters compares favorably to the area percentage for the olefination/esterification reaction method described in Example 3 that was catalyzed for 3 h with Dowex50WX2 at 120° C.

As for the Example 3 results, phenolic compounds present in the original raw bio-oil, such as phenol, 2-methylphenol, 2-methoxyphenol, 2-methoxy-4-methyl phenol, etc., are also present in reduced quantities in the olefinated/esterified product produced by the method of the current example: high-pressure batch autoclave reaction with Ni—Si/Al catalyst.

TABLE 8

Selected organic oxygen containing components of bio-oil upgraded with 1-octene/1-butanol with Ni—Si/Al catalyst at 250° C. under pressure for 2 h in a batch high-pressure autoclave.

| Components | % Total | Components | % Total |
|---|---|---|---|
| Acids | | Esters | |
| Oleic acid | 0.292 | n-Butyl propionate | 2.193 |
| Propanoic acid | 2.193 | Pentanoic acid, 4-oxo-butyl ester | 0.813 |
| Acetic acid | 1.57 | Butanoic acid, hexyl ester | 1.461 |
| Abietic acid | 0.545 | Propanoic acid, 2-hydroxy-,butyl ester | 1.143 |
| Dodecanoic acid | 0.296 | n-butyl acetate | 14.150 |
| Pentadecenoicacid | 0.295 | n-Butyl pentanoate | 0.637 |
| Butanedioc acid, methyl bis(1-methyl)p | 0.925 | Hexanoic acid,5-oxo-ethyl ester | 0.328 |
| Benzeneacetic acid 4,hydroxy-3-methen | 0.563 | Octadecanoic acid, methyl ester | 0.916 |
| Phenols | | n-Butyl butanedioaate | 0.712 |
| 2,5-dimethylphenol | 0.417 | Nonanedoicacid, dibutyl ester | 0.223 |
| 2-Methoxy-4-methyl phenol | 5.312 | Benzeneacetic acid, alpha-(acetyloxy)-2 methoxy-,methyl ester | 0.206 |
| 2-Methoxy phenol | 2.33 | | |
| 4-Ethyl-2-methoxy phenol | 2.193 | Pthalic acid, 3,5 dimethyl phenyl 3 methyl phenyl ester | 0.211 |
| Phenol, 2-methoxy-4-propyl | 3.84 | | |
| 4-(1-methyl-1-cyclo butyl)phenol | 0.193 | Dibenzene(9) benzimidiazole 2-(2-furyl)-3-methyl | 0.257 |
| Phenol, 2-methoxy-4-propyl | 3.84 | | |
| Phenol,2-methoxy-4-(1-Propenyl) | 0.336 | Benzoic acid, 3,5-bis trimethoxyl siloxyl-methyl ester | 0.124 |
| Ethanone,1-(4-hydroxy-3-methoxy phenol) | 0.398 | | |
| | | Hexadecanoic acid,1,1-dimethyl ethyl ester | 0.556 |
| Phenol,3-(dimethylamino) | 0.099 | Hexadeanoic acid butyl ester | 0.162 |
| Ethyl-beta-(4-hydroxy-3-methoxy phenol)propionate | 0.116 | Octyly butanoate | 0.396 |
| | | Others | |
| Ketones and aldehydes | | 1-Octene | 21.368 |
| 9-Octadecenal | 0.552 | Butylcapxylate | 0.061 |
| 2,4,Heptadione 2,6-dimethyl | 0.105 | Isobutylisothioxynote | 0.569 |
| Acetaldehyde (3,3-dimethyl cyclohexylide) | 0.095 | 1,5-Dodeadrene | 0.255 |
| | | Sugars | |
| 2-Propanone,1-(4-hydroxy-3-methoxy | 1.012 | Anhydrosugars | 0.4 |

TABLE 8-continued

Selected organic oxygen containing components of bio-oil upgraded with 1-octene/1-butanol with Ni—Si/Al catalyst at 250° C. under pressure for 2 h in a batch high-pressure autoclave.

| Components | % Total | Components | % Total |
|---|---|---|---|
| phenyl) | | | |
| 1-(2,4-Diethoxy phenyl)-ethanone | 0.073 | | |
| Alcohols | | | |
| 1-Butanol | 1.618 | | |
| 2,3-Butanediol,2,3-dimethyl | 1.452 | | |
| Homovanillyl alcohol | 1.042 | | |
| 3-Amino-4-methyl benzyl alcohol | 0.333 | | |
| mics. It is likely that the Example 6 method will be more economic to apply as reaction time Furfuryl alcohol | 0.86 | | |

Table 9 compares the fuel properties of raw and olefinated/esterified bio-oils produced by both the current pressurized autoclave method and the Example 3 method. For all properties, the results were very similar regardless of the olefination/esterification method applied. For each method, when compared to raw bio-oil, water content is reduced by more than 80%, HHV is increased by more than 70%, pH is increased by more than 30%, carbon content is increased by more than 17%, hydrogen content is increased by more than 60% and oxygen content is reduced by more than 60%. These results show that fuel values are all dramatically improved for each method to approximately the same degree.

Table 10 compares initial raw bio-oil viscosity and olefinated/esterified bio-oil viscosity produced by the catalyzed reaction in the high-pressure autoclave. Kinematic viscosities were determined following aging at 90° C. over 6 h increments for a total of 24 h of aging. Initial raw bio-oil viscosity was 7.15 cSt compared to 5.6 cSt for the olefinated/esterified product. Subsequent raw bio-oil kinetic viscosity was not possible to test as it polymerized to a very thick condition. The viscosity changes over 24 h for the olefinated/esterified product were slight with highest viscosity of 6.3 demonstrated at 18 hours of 90° C. heating. This was only a 12.5% increase in viscosity. It is clear from these results that the olefinated/esterified product of the current example treatments produced a highly stable bio-oil that could be stored and shipped at ambient temperatures without substantial aging over time.

The results of the comparison of the olefinated/esterified bio-oil product produced by the current example differs little from that produced by the Example 5 methods. Choice of process can be determined on the basis of process economics. The process for the current autoclave method can be modified to allow production in a continuous packed bed reactor which will allow the required reaction time to be reduced to seconds as compared to the 3 h required for the Example 5 method. Therefore, economics is likely to favor the production of olefinated/esterified bio-oil by the method of the current example.

TABLE 9

Fuel properties of raw bio-oil and bio-oil upgraded with 1-octene/1-butanol over Ni—Si/Al catalyst for 2 h.

| Properties | Raw bio-oil | Current example (6) pressurized autoclave properties | Example 5 properties |
|---|---|---|---|
| Water %-wt | 28.60 | 6.00 | 7.385 |
| HHV(MJ/kg) | 17.20 | 32.80 | 29.77 |
| pH value | 2.30 | 3.30 | 3.47 |
| C (%) | 52.10 | 65.01 | 61.05 |
| H (%) | 6.40 | 10.28 | 10.55 |
| O (%) | 43.50 | 24.54 | 28.18 |

TABLE 10

Results of accelerated aging on raw and olefinated/esterified bio-oil produced by catalysis in a high-pressure autoclave. Accelerated aging was applied by subjecting the bio-oils to a temperature of 90° C. over a 24 h period; viscosity measurements were taken at initial and at 6 h intervals over the 24 h period.

| | Kinematic viscosity (cSt) | | | | |
|---|---|---|---|---|---|
| Treated and raw bio-oils | Initial value | Aged for 6 h at 90° C. | Aged for 12 h at 90° C. | Aged for 18 h at 90° C. | Aged for 24 h at 90° C. |
| Autoclaved olefinated/ esterified bio-oil | 5.60 | 5.82 | 5.82 | 6.30 | 6.00 |
| Raw bio-oil | 7.15 | N/A | | | |

We have applied simultaneous olefination/esterification of bio-oil by utilizing 1-butene gas as the pressurizing gas in a batch autoclave. Temperature applied was 250° C. with pressure of 100 psi helium, and 1-butene was also under 30 psi of pressure, to obtain a combined total pressure of 130 psi. A mixture of bio-oil (83%), butanol (14%) and approximately 1-octene (3%) was catalyzed with 5 wt % of nickel on silica alumina (Ni—Si/Al) catalyst. The reaction was performed for a period of 2 h with the treated bio-oil allowed to cool in the reactor. The mixture was centrifuged for 2 h to separate the resulting aqueous and organic phase resulting from the reaction. After centrifugation, the less dense (0.95 g/ml) organic phase was clearly separated from the aqueous phase and floated on the surface of the 1 g/l density water. The organic phase was removed with a separating funnel by gravity.

The chemical and physical results from this experiment were nearly identical to that described previously in this example in which liquid 1-octene was utilized as the olefination agent.

Example 5

Bio-Oil Esterification by Sonication

Twenty wt % of methanol was combined with bio-oil and placed in a sonicator vessel (Hielscher-Ultrasound Technology, Germany) with 1% sulfuric acid as catalyst. Sonication was performed for 30 minutes with 100% amplitude at 375 Hz and 287 Watts. Esterified physical and chemical properties were determined and compared with raw bio-oil and esterified bio-oil produced by the heating method as described in Example 1 but with 2% $H_2SO_4$ catalyst addition. The goal of this experiment was to compare addition of half of the catalyst utilized for the heating method for the sonication results to determine if reduced catalyst addition would produce equivalent esterified bio-oil results.

Table 11 shows that the 23.26 HHV of the sonicated esterified bio-oil is nearly identical to that for the esterified bio-oil produced by the heating method; the higher heating value of the sonicated product had an HHV more than 30% higher than the 17.51 value for raw bio-oil. As expected, water content value increased for both the esterified methods with water content values of 24.5% for the heated method and 25.8% for the sonicated method, as compared to 24.2% for raw bio-oil. The fact that the water content resulting from application of sonication was 5.3% higher than for the heating method indicates that the esterification reaction was pushed further. Kinematic viscosity measured at 20° C. was 8.28, as compared to 12.87 for esterification by heating method, and 26.9 for raw bio-oil, showing that the esterified method results in lowered viscosity which is more suitable for utilization of the esterified product as a fuel. Acid value was reduced by nearly 50% for both esterified bio-oil produced by the heating and sonication methods.

TABLE 11

Physical properties of esterified bio-oil produced by 30 m of sonication at 100% amplitude at 375 Hz and 287 Watts. Bio-oil had 20 wt % of methanol addition catalyzed by % $H_2SO_4$ catalyst.

| Property | Test method | Raw bio-oil | Esterified bio-oil | Sonicated esterified bio-oil | Units |
|---|---|---|---|---|---|
| Higher Heating Value | D240 | 17.51 | 23.83 | 23.26 | MJ/kg |
| Water Content | E203 | 24.2 | 24.5 | 25.8 | mass % |
| Acid Value | NA | 99.3 | 55.2 | 54.7 | mg KOH/g |
| Suspended Solids Content | Insolubles in MeOH-DCM | 0.54 | 0.43 | 0.42 | mass % |
| Kinematic Viscosity @ 20° C. | D445 | 29.69 | 12.87 | 8.28 | mm²/s |

A GC/MS area % comparison of the esters produced by raw bio-oil, esterified bio-oil produced by the heating method, and by sonication are given in Table 12. These results show that sonication produces approximately equivalent amounts of methylacetate and hydroxymethyl acetate as is produced by the heating method of Example 1. In addition, the ester 2-hydroxy-propanoic acid methyl ester was produced at nearly double the amount produced by the Example 1 method. These GC/MS results indicate that sonicated esterification is as effective as the heating method for a sonication time of only 30 m when catalyzed by 50% as much acid. Therefore, sonication represents a novel improvement of the Example 1 method and comprises one component of our current invention.

TABLE 11

GC/MS comparison by area % of the esters produced by raw bio-oil, esterified bio-oil produced by the Example 1 heating method and by sonication of the current example.

| Esterified product | Raw bio-oil (%) | Esterification by heating from Example 1 (%) | Sonicated esterified bio-oil (%) |
|---|---|---|---|
| Methylacetate | 0.0 | 5.734 | 5.523 |
| Hydroxymethyl acetate | 0.0 | 1.262 | 1.018 |
| 2-Hydroxy-propanoic acid methyl ester | 0.0 | 0.477 | 0.792 |

All references cited with this application are herein fully incorporated by reference. Variations, modifications, and additions to this invention will be readily apparent to one skilled in the art, and such modifications and additions would be fully within the scope of the invention, which is limited only by the following claims.

REFERENCE CITED

Boucher, M. E., A. Chaala and C. Roy. 2000a. Bio-oils obtained by vacuum pyrolysis of soft wood bark as a fuel for turbine engines. Part 1: Properties of bio-oils and its blend with methanol and pyrolytic aqueous phase. Biomass and Bioenergy, 19(5), 337-350.

Challinor, J. M. 2001. Review: The development and applications of thermally assisted hydrolysis and methylation reactions. Journal of Analytical and Applied Pyrolysis, 61, 3-34.

Del Rio, J. C., A. Gutierrez, I. M. Rodriguez, D. Ibarra and A. T. Martinez. 2007. Composition of non-woody plant lignins and cinnamic acids by Py-GC/MS, Py-TMAH and FTIR. Journal of Analytical and Applied Pyrolysis, 79, 39-46.

Deng, L., Y. Fu and Q. X. Guo. 2009. Energy Fuels 23, 564-568.

Diebold, J. P. and S. Czernik. 1997. Additives to lower and stabilize the viscosity of pyrolysis oils during storage. Energy and Fuels, 11, 1081-1091.

Filley, T. R., R. D. Minard, and P. G. Hatcher. 1999. Tetramethylammonium hydroxide (TMAH) thermochemolysis: proposed mechanisms based upon the application of $^{13}C$ labeled TMAH to a synthetic model lignin dimmer. Organic Geochemistry, 30, 607-621.

Gauthier, A., S. Derenne, C. Largeau, L. Dupont, E. Guillon, J. Dumonceau, and A. Aplincourt. 2003. Comparative study of lignocellulosic materials from wheat straw and of pure and mixed standard compounds via solid state $^{13}C$ NMR spectroscopy, conventional pyrolysis and TMAH thermochemolysis. Journal of Analytical and Applied Pyrolysis, 67, 277-293.

Hitten, R. N., B. P. Bibens, J. R. Kastner and K. C. Das. 2009. In-line esterification of pyrolysis vapor with ethanol improves bio-oil quality. Energy and Fuels, 24, 673-682.

Joll, C. A., T. Huynh, A. Heitz. 2003. Off-line tetramethylammonium hydroxide thermochemolysis of model compound aliphatic and aromatic carboxylic acids: decarboxylation of some ortho- and/or para-substituted aromatic carboxylic acids. Journal of Analytical and Applied Pyrolysis, 70, 151-167.

Klingberg, A., J. Odermatt, and D. Meier. 2005. Influence of parameters of pyrolysis-GC/MS of lignin in the presence of tetramethylammonium hydroxide. Journal of Analytical and Applied Pyrolysis, 74, 104-109.

Kuroda, K. and A. Nakagawa-izumi. 2006. Tetramethylammonium hydroxide (TMAH) thermochemolysis of lignin: improvement of the distribution profile of products derived from β-aryl ether subunits. Journal of Analytical and Applied Pyrolysis, 75, 104-111.

Kuroda, K., A. Nakagawa-izumi and D. R. Dimmel. 2002. Pyrolysis of lignin in presence of tetramethylammonium hydroxide (TMAH): products stemming from β-5 substructures. Journal of Agricultural and Food Chemistry, 50, 3396-3400.

Moens, L. and S. Czernik. 2008. A method for neutralization and stabilization of biomass pyrolysis oils. Am. Chem. Soc., Div Fuel chem. Prep. Pap. 53(1): 347-348.

Peng, J., P. Chen, H. Lou and X. M. Zheng. 2008. Energy Fuels 22, 3489-3492.

Peng, J., P. Chen, H. Lou and X. M. Zheng. 2009. Bioresource Technology 100, 3415-3418.

Radlein, D. 1997. Methods of upgrading biomass pyrolysis liquids for use as fuels and as a source of chemicals by reaction with alcohols. Fuel and Energy Abstracts, 38(2): 79-79.

Schwarzinger, C., I. Tanczos and H. Schmidt. 2002. Levoglucosan, cellbiose and their acetates as the model compounds for the thermally assisted hydrolysis and methylation of cellulose and cellulose acetate. Journal of Analytical and Applied Pyrolysis, 62, 179-196.

Tang, Z., Q. Lu, Y. Zhang, X. F. Zhu and Q. X. Guo. 2009. Ind. Eng. Chem. Res. 48, 6923-6929.

Tang, Y., W. J. Yu, L. Y. Mo, H. Lou and X. M. Zheng. 2008. Energy Fuels 22, 3484-3488.

Tanczos, I., M. Schoflinger, H. Schmidt and J. Balla. 1997. Cannizzaro reaction of aldehydes in TMAH thermochemolysis. Journal of Analytical and Applied Pyrolysis, 42, 21-31.

Xiong, W-M., M-Z. Zhu, L. Deng, Y. Gu and Q-X Guo. 2009. Esterification of organic acid in bio-oil using acidic ionic liquid catalysts. Energy and Fuels 23, 2278-2283.

Yang, X. L., S. Chatterjee, Z. J. Zhang, X. F. Zhu and C. U. Pittman, Jr. 2010. Ind. Eng. Chem. Res. 49, 2003-2013.

Zhang, Q., J. Chang, T. J. Wang and Y. Xu. 2006. Upgrading bio-oil over different solid catalysts. Energy Fuels 20, 2717-2710.

Zhang, Z. J., Q. W. Wang, X. L. Yang, S. Chatterjee and C. U. Pittman, Jr. 2010. Bioresource Technology 101, 3685-3695.

U.S. PATENT DOCUMENTS

Marker, T. L. and J. A. Petri. 2008. Gasoline and diesel production from pyrolytic lignin produced from pyrolysis of cellulosic waste. U.S. Patent No. 20080053870.

Malkamaki, M. and J. Hintikka. 2007. Equipment and process for producing biodiesel using ultrasound and hydrogen peroxide. International Pub. No. WO 2007/0777302. World International Property Organization.

Nurhan, E. and P. Panning. 2002. Method for producing fatty acid methyl ester and equipment for realizing the same. U.S. Pat. No. 6,440,057. U.S. Patent Office, Washington, D.C.

FOREIGN PATENT DOCUMENTS

Radlein, D. St. A. G., J. K. Piskorz and P. A. Majerski. 1995. Method of upgrading biomass pyrolysis liquids for use as fuels and as a source of chemicals by reaction with alcohols. Application for Canadian Patent No. 2,165,858.

The invention claimed is:

1. A method for upgrading bio-oils to less recalcitrant fuels comprising esterifying said bio-oil, wherein said bio-oils may be raw bio-oil or pyroligneous bio-oil or a mixture of raw bio-oil and pyroligneous bio-oil, and olefinating bio-oil while simultaneously esterifying said bio-oil.

2. The method of claim 1 further comprising the step of olefinating esterified bio-oil.

3. A method for upgrading bio-oils to less recalcitrant fuels comprising esterifying said bio-oil, wherein said bio-oils may be raw bio-oil or pyroligneous bio-oil or a mixture of raw bio-oil and pyroligneous bio-oil wherein the reaction is caused by injecting or spraying the combined alcohol and catalyst into hot pyrolysis vapor stream produced during pyrolysis of biomass.

4. The method of claim 3 wherein the injection or spraying into the hot pyrolysis vapor stream is performed at a location on an apparatus of a pyrolysis reactor carrying pyrolysis vapors to the reactor condenser.

5. The method of claim 3 wherein said spraying is performed by a sprayer capable of producing small droplets.

6. The method of claim 2 wherein the step of olefinating esterified bio-oil is performed by reacting olefin and esterified bio-oil mixture with a heterogeneous catalyst.

7. The method of claim 6 wherein the olefin is a mixture of olefins.

8. The method of claim 6 wherein the olefination reaction is performed by heating the olefin, esterified bio-oil, and catalyst mixture.

9. The method of claim 8 wherein the olefination reaction is performed at above ambient pressure.

10. The method of claim 6 wherein the olefination reaction is promoted by sonication, microwave excitation or high-shear mixing.

11. The method of claim 1 wherein the step of olefinating bio-oil while simultaneously esterifying said bio-oil is performed by combining bio-oil, olefin, and alcohol with a heterogeneous catalyst to cause a reaction.

12. The method of claim 11 wherein said alcohol is comprised of a mixture of alcohols.

13. The method of claim 10 wherein said olefin is comprised of a mixture of olefins.

14. The method of claim 11 wherein the step of olefinating bio-oil while simultaneously esterifying said bio-oil includes heating of the mixture.

15. The method of claim 12 wherein the heated olefin, esterified bio-oil mixture is reacted at above ambient pressure.

16. The method of claim 11 wherein the step of olefinating bio-oil while simultaneously esterifying said bio-oil is caused by sonication, microwave excitation or high-shear mixing.

17. The method of claim 11 wherein the step of olefinating bio-oil while simultaneously esterifying said bio-oil is caused by injecting or spraying the said olefin, alcohol and heterogeneous catalyst mixture into a hot pyrolysis vapor stream produced during pyrolysis of biomass.

18. The method of claim 17 wherein the injecting or spraying into the hot pyrolysis vapor stream is performed at a location on an apparatus of a pyrolysis reactor carrying pyrolysis vapors to the reactor condenser.

19. The method of claim 17 wherein spraying is performed by a sprayer capable of producing fine droplets.

20. The method of claim 1 in which the step of olefinating bio-oil while simultaneously esterifying said bio-oil is performed by reacting a olefin, an alcohol and heterogeneous catalyst in a heated high-pressure autoclave.

21. The method of claim 20 wherein the heterogeneous catalyst is Ni—Si/Al.

22. The method of claim 1 in which the step of olefinating bio-oil while simultaneously esterifying said bio-oil is performed by reacting olefin, alcohol and heterogeneous catalyst in a heated packed-bed reactor.

23. The method of claim 22 wherein the heterogeneous catalyst is Ni—Si/Al.

* * * * *